(12) United States Patent
Chau (10) Patent No.: US 9,141,673 B2
(45) Date of Patent: Sep. 22, 2015

(54) CLOUD-BASED PHONE SYSTEM WITH METHODOLOGIES FOR SUGGESTING ACCOUNT CONFIGURATION SETTINGS

(71) Applicant: RingCentral, Inc., San Mateo, CA (US)

(72) Inventor: Vi Chau, San Francisco, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/797,627

(22) Filed: Mar. 12, 2013

(65) Prior Publication Data

US 2014/0280100 A1   Sep. 18, 2014

(51) Int. Cl.
*G06Q 30/00* (2012.01)
*G06F 17/30* (2006.01)

(52) U.S. Cl.
CPC ................................ *G06F 17/3053* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 6,052,787 A * | 4/2000 | Euchner et al. | 726/1 |
| 7,627,828 B1 * | 12/2009 | Collison et al. | 715/752 |
| 7,984,484 B1 * | 7/2011 | Rakowski et al. | 726/3 |
| 7,996,310 B1 * | 8/2011 | Edwards et al. | 705/40 |
| 2007/0022118 A1 * | 1/2007 | Layne | 707/9 |
| 2012/0023576 A1 * | 1/2012 | Sorensen et al. | 726/22 |
| 2012/0117026 A1 * | 5/2012 | Cassidy | 707/634 |
| 2012/0311564 A1 * | 12/2012 | Khalid | 718/1 |
| 2013/0086658 A1 * | 4/2013 | Kottahachchi et al. | 726/6 |
| 2013/0124361 A1 * | 5/2013 | Bryson | 705/26.7 |
| 2013/0150028 A1 * | 6/2013 | Akins et al. | 455/427 |
| 2013/0197967 A1 * | 8/2013 | Pinto et al. | 705/7.28 |

* cited by examiner

*Primary Examiner* — Tarek Chbouki
(74) *Attorney, Agent, or Firm* — Finnegan, Henderson, Farabow, Garrett & Dunner LLP (57) ABSTRACT

A cloud-based phone system with methodologies for suggesting account configuration settings is provided. In one embodiment, for example, techniques are provided for suggesting how a particular user should configure a particular account configuration parameter of a plurality of account configuration parameters available to the particular user. One or more parameters of the plurality of account configuration parameters that are related to the particular parameter are identified. One or more other users are identified that have configured the one or more parameters similar to how the particular user has configured the one or more parameters. A suggestion of how the particular user should configure the particular parameter is made based on settings for the particular parameter made by the one or more other users.

22 Claims, 3 Drawing Sheets

CLOUD-BASED PHONE SYSTEM WITH METHODOLOGIES FOR SUGGESTING ACCOUNT CONFIGURATION SETTINGS

FIELD OF THE INVENTION

The present invention relates to cloud-based phone systems and, more particularly, to cloud-based phone systems with methodologies for suggesting user account configuration settings.

BACKGROUND

Today, cloud-based phone systems exist that allow business to take advantage of business phone system functionality without the complexity and cost of an on-premise phone system. Such cloud-based phone systems use the Internet to deliver features of an on-premise private branch exchange (PBX) system without timely setup and expensive hardware. Advantageously, since the Internet is not bound to a specific location, a cloud-based phone system can more easily integrate multiple locations and remote employees when compared to on-premise systems.

Cloud-based phone systems typically provide users with a powerful array of configurable call management account setting parameters. Such configurable parameters can include call answering rules, call forwarding rules, call notification settings, voicemail settings, caller identification settings, call greeting options, among many others. Given the large number of configurable parameters users of cloud-based phone systems are presented with, such users would appreciate solutions that help them more easily manage their personal settings. The present invention fulfills this and other needs.

SUMMARY

The set of claims at the end of this document is incorporated by reference into this section as a useful summary of embodiments of the present invention.

DETAILED DESCRIPTION

Glossary

The following definitions are offered for purposes of illustration, not limitation, in order to assist with understanding the discussion that follows.

Cloud-based phone system: A cloud-based phone system (also known as "Internet phone system", "virtual PBX", "cloud-based PBX" or "hosted phone system") is a phone service delivered through the Internet, typically to businesses. In contrast to traditional business phone systems that require businesses to purchase and maintain PBX hardware on their premises, a hosting provider is responsible for procuring and managing PBX software and hardware involved in the cloud-based phone system service at one or more off-site hosting locations (e.g., one or more data centers). Cloud-based phone systems typically can function over the public switched telephone network (PSTN), over the Internet, or over a combination of the two. Since the PBX software and hardware is maintained and housed at the hosting provider's facilities by the hosting provider, benefits to customers of a cloud-based phone system can include reduced capital expenditure, access to 24-hour customer support, and reduced IT administration.

Internet: The Internet is a global system of interconnected computer networks that use the standard Internet protocol suite to server many users worldwide. The Internet is a network of networks that consists of many private, public, academic, business, and government networks, of local to global scope, linked by a broad array of electronic, wireless, and optical networking technologies. The Internet carries an extensive range of information resources and services, such as the inter-linked hypertext documents of the World Wide Web (WWW) and the infrastructure to support e-mail.

PSTN: PSTN stands for public switched telephone network. The PSTN is the network of the world's circuit-switched telephone networks. It consists of telephone lines, fiber optic cables, microwave transmission links, cellular networks, communications satellites, and undersea telephone cables, all inter-connected by switching centers, thereby allowing virtually any telephone in the world to communicate with any other telephone. Originally a fixed-network of analog telephone systems, the PSTN is now almost entirely digital in its core and includes mobile as well as fixed telephones.

VoIP: VoIP stands for voice over Internet Protocol. VoIP commonly refers to the communication protocols, technologies, methodologies, and transmission techniques involved in delivery of voice communications and multimedia session over Internet Protocol (IP) networks, such as the Internet. VoIP is also referred to as "IP telephony", "Internet telephony", "voice over broadband (VoBB)", "broadband telephony", "IP communications", and "broadband phone".

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

The techniques described herein can be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 1:
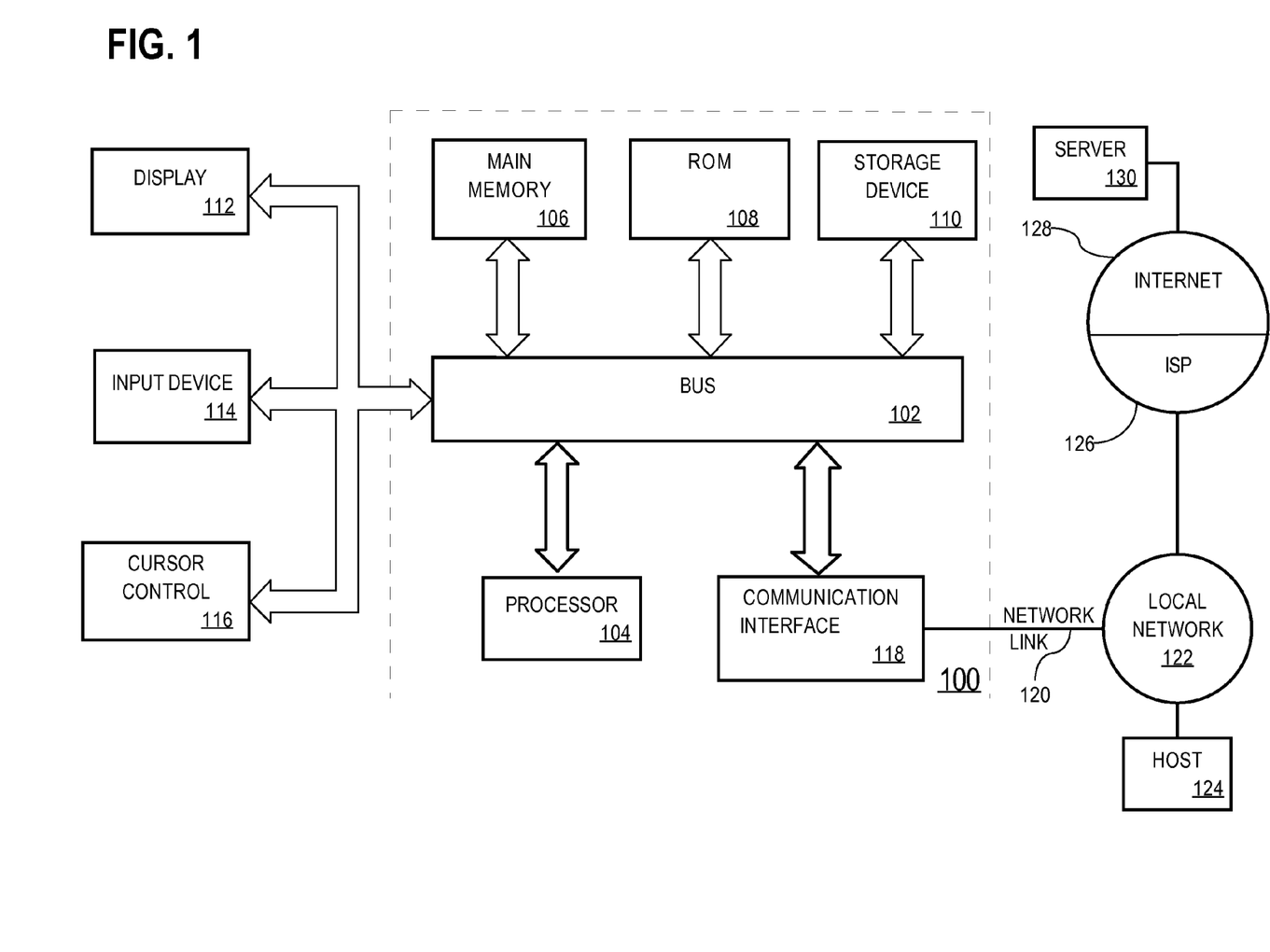
FIG. 1 is a very general block diagram of a computer system in which software-implemented processes of the present invention may be embodied.

For example, FIG. 1 is a block diagram that illustrates a computer system 100 upon which an embodiment of the invention may be implemented. Computer system 100 includes a bus 102 or other communication mechanism for communicating information, and a hardware processor 104 coupled with bus 102 for processing information. Hardware processor 104 may be, for example, a general purpose microprocessor.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may implement the techniques described herein using customized hard-wired logic, one or more ASICs or FPGAs, firmware and/or program logic which in combination with the computer system causes or programs computer system 100 to be a special-purpose machine. According to one embodiment, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

The above-described computer hardware and software are presented for purposes of illustrating the basic underlying computer components that may be employed for implementing the present invention. For purposes of discussion, the following description will present examples in which it will be assumed that there exist one or more "server" computing devices (e.g., a cloud-based phone system server) that communicate with one or more "client" computing devices (e.g., a desktop computer, laptop computer, mobile phone, desktop phone, etc.). The present invention, however, is not limited to any particular environment or device configuration. In particular, a client-server-based distinction is not necessary to the invention, but is used to provide a framework for discussion. Instead, the present invention may be implemented in any type of system architecture or processing environment capable of supporting the methodologies of the present invention presented in detail below.

Overview of Suggesting Account Configuration Settings

In some situations, it would be desirable to suggest to a user of a cloud-based phone system how the user should configure an account configuration parameter. For example, in the context of suggesting account configuration settings to users, it is useful to know how a user should configure an account configuration parameter, so that a suggestion for configuring the parameter can be made to the user. A suggestion is valuable to the user if the user accepts the suggestion or simply if the user learns about possible configurations based on the suggestion.

Techniques for suggesting how a user should configure an account configuration parameter of a cloud-based phone system are provided. In some embodiments, the techniques generally involve suggesting how a user should configure an account configuration parameter based on initial configuration and usage of the system, relatedness of account configuration parameters, and similarities of settings of account configuration parameters made by both the user and one or more other users.

The techniques can applied with different types of account configuration parameters including selection and choice parameters that can be configured with one setting selected by the user from among a discrete set of possible settings and text-entry parameters that can be configured with data based on text entered by the user into a form field. An example of a selection and choice parameter in the context of a cloud-based phone system could be "Block all calls without Caller ID" that accepts a true/false, on/off, or yes/no setting. An example of a text-entry parameter could be a "Call blocking" parameter that accepts a user-entered phone number or set of phone numbers.

Figure 2:
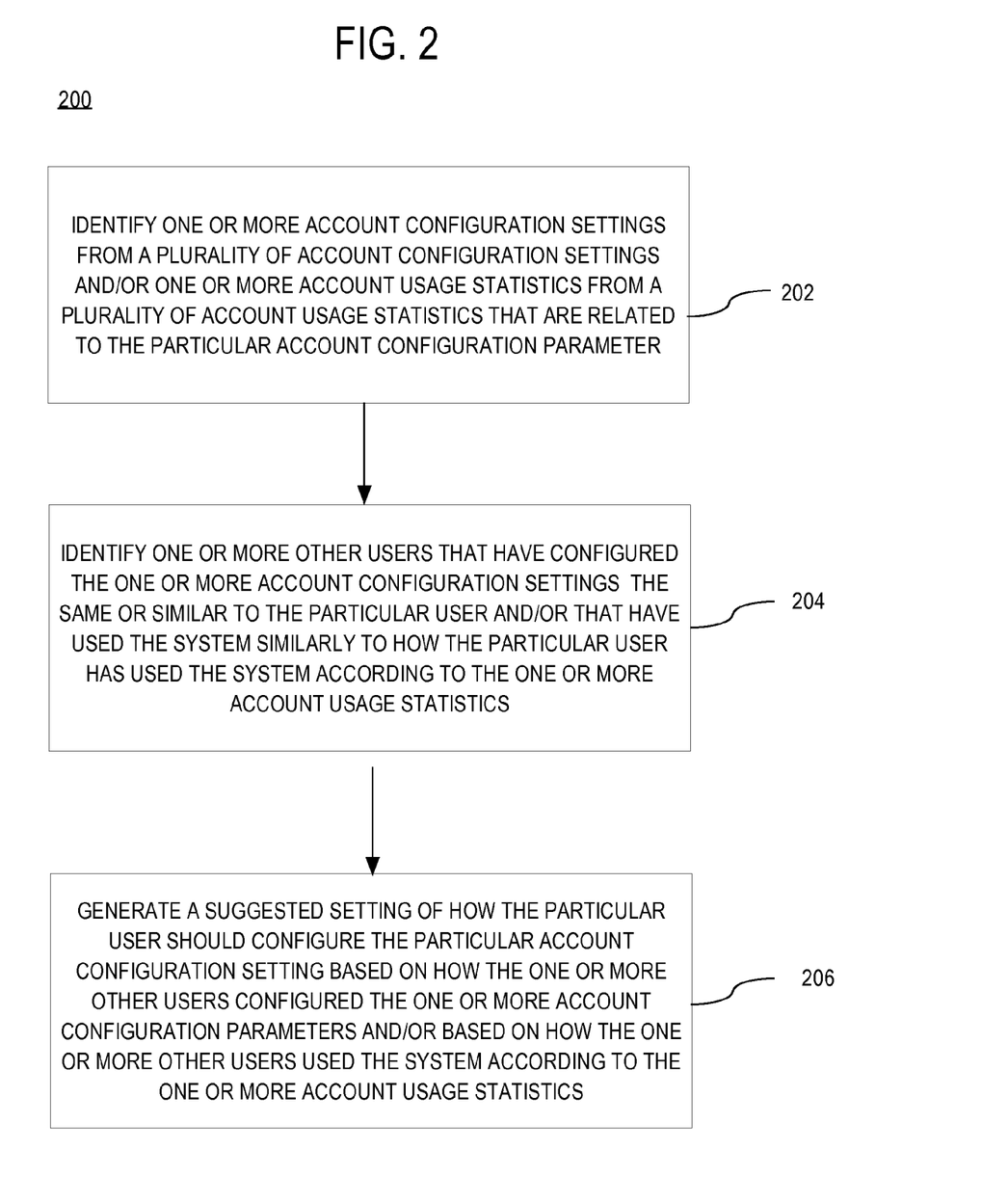
FIG. 2 is a flow diagram illustrating a process for suggesting how a user of cloud-based phone system should configure a particular account configuration parameter according to an embodiment of the invention.

FIG. 2 is a flow diagram 200 illustrating a process for suggesting how a user should configure a particular account configuration parameter according to an embodiment of the invention. The process can be performed by one or more computing devices. For example, the process can be performed by one or more computing devices of a cloud-based phone system.

At block 202, one or more account configuration parameters from a plurality of account configuration parameters, and/or one or more account usage statistics from a plurality of account usage statistics, are identified that are related to the particular account configuration parameter.

At block 204, one or more other users are identified that have configured the one or more account configuration parameters similarly to how the user has configured the one or more account configuration parameters and that have also configured the particular account configuration parameter, and/or that have used the system similarly to how the user has used the system according to the one or more account usage statistics.

At block 206, a suggestion of how the user should configure the particular account configuration parameter is generated based on settings made by the one or more other users for the particular account configuration parameter. This process is described in greater detail below.

Identifying Other Account Configuration Parameters and/or Account Usage Statistics that are Related to the Particular Account Configuration Parameter In some embodiments, a set of related account configuration parameters and/or account usage statistics that are related to the particular account configuration parameter are identified. Related account configuration parameters can include any of the account configuration parameters supported by the cloud-based phone system. Related account usage statistics can include any of the account usage statistics recorded by the cloud-based phone system. A variety of techniques may be used to determine related account configuration parameters and/or related account usage statistics, depending on the requirements of the particular implementation at hand, and the present invention is not limited to any particular technique.

According to one embodiment, related account configuration parameters are identified from a set of account configuration parameters supported by the cloud-based phone system based on an administrator-configurable, user-configurable, and/or predefined static mapping between the related account configuration parameters and the particular account configuration parameter. Thus, other account configuration parameters that are mapped to the particular account configuration parameter are considered to be related to the particular account configuration parameter. The mapping is not necessarily bi-directional. Thus, although an account configuration parameter A may be mapped to account configuration parameter B and therefore included in the set of related account configuration parameters for account configuration parameter B, account configuration parameter B may, or may not be, mapped to account configuration parameter A in the mapping.

According to one embodiment, related account configuration parameters are identified from a set of account configuration parameters supported by the cloud-based phone system that satisfy relatedness criteria with respect to the particular account configuration parameter. Thus, other account configuration parameters that satisfy the relatedness criteria with respect to the particular account configuration parameter are considered to be related to the particular account configuration parameter. Relatedness is not necessarily symmetrical. Thus, although an account configuration parameter A can be considered related to particular account configuration parameter B and therefore included in a set of related account configuration parameters for the particular account configuration parameter B, particular account configuration parameter B may or may not be sufficiently related to account configuration parameter A to be considered related to account configuration parameter A and included in the set of related account configuration parameters for account configuration parameter A.

According to one embodiment, related account usage statistics are identified from a set of account usage statistics recorded by the cloud-based phone system that satisfy relatedness criteria with respect to the particular account configuration parameter. Thus, other account usage statistics that satisfy the relatedness criteria with respect to the particular account configuration parameter are considered to be related to the particular account configuration parameter.

In some embodiments, the number of related account configuration parameters and related account usage statistics is limited to a specified number to reduce the amount of computational resources and time required to generate a suggested setting for a particular account configuration parameter. For example, the specified number of account configuration parameters and related account usage statistics can represent the first specified number of account configuration parameters and related account usage statistics that satisfy the relatedness criteria for the particular account configuration parameter, or can represent the specified number of account configuration parameters and related account usage statistics that satisfy the relatedness criteria for the particular account configuration parameter with relatedness above some predetermined level or threshold.

The relatedness criteria can include a wide variety of criteria, depending on the requirements of the particular implementation at hand, and the invention is not limited to any particular relatedness criteria. One example of relatedness criteria is a statistical correlation threshold. Thus, two account configuration parameters that satisfy the statistical correlation threshold are considered to be related to each other. The relatedness criteria are not necessarily one to one. For example, the combination of one or more account configuration parameters and account usage statistics may together satisfy the relatedness criteria for the particular account configuration parameter.

A wide variety of statistical measures can be used for this purpose, depending on the requirements of the particular implementation at hand, and the invention is not limited to any particular statistical measure of relatedness. For example, a statistic may measure how often (e.g., the frequency with which) account configuration parameters are changed by users based on recorded data that reflects a history of user changes to account configuration parameters. Thus, two account configuration parameters that are changed by users with the same or similar frequency within a threshold may be considered related. In another example, a statistic may measure the aggregate account usage of users over a given period of time (e.g., the distribution of times and locations from which calls are made and received in a given day) as it relates to the particular account configuration parameter (e.g., call answering rules that specify which user devices are to receive calls for given times and user locations).

Identifying Other Users that have Configured the Related Account Configuration Parameters and/or Account Usage Statistics Similar to the Particular User Once related account configuration parameters and/or account usage statistics have been determined, one or more users of the cloud-based phone system that have configured the related account configuration parameters the same or similar to the particular user and/or have used the system in the same or similar manner as the particular user according to the related account usage statistics are identified. All the users of the cloud-based phone system can be evaluated for this purpose. However, evaluating all users can be impractical where the number of users is large. Further, some users may be more useful than other users because they are related to the particular user by department, division, organization, business area, business vertical, or other relationship.

According to some embodiments of the present invention, a subset of all users of the cloud-based phone system, referred to herein as related users, is determined based on predetermined user selection criteria. Related users can be a subset of all users that satisfy the predetermined user selection criteria. A wide variety of user selection criteria can be used, depending on the requirements of the particular implementation at hand, and the present invention is not limited to any particular user selection criteria.

According to some embodiments of the present invention, the user selection criteria include a predetermined relationship with respect to the particular user. Thus, users from all users that do not have the predetermined relationship with the particular user are not included in the related users. A wide variety of predetermined relationships can be used, depending on the requirements of the particular implementation at hand, and the present invention is not limited to any particular relationship. For example, the predetermined relationship can be organizationally-based such as employed at the same company as the particular user, works in the same department, division, group, etc. as the particular user, or has the same or similar job, position, or title as the particular user.

Generate a Suggestion of how the Particular User should Configure the Particular Account Configuration Parameter According to some embodiments, generating a suggestion of how the particular user should configure the particular account configuration parameter generally involves identifying which users have configured the related account configuration parameters the same or similarly to the particular user and/or have used the system in the same or similar manner as the particular user according to the related account usage statistics, and then generating the suggestion based on how those users configured the particular account configuration parameter. In situations where related users are identified from all users as described above, then generating the suggestion generally involves identifying which reference users have configured the related account configuration parameters the same or similarly to the particular user and/or have used the system in the same or similar manner as the particular user according to the related account usage statistics, and then generating the suggestion based on how those related users configured the particular account configuration parameter. Embodiments of generating suggestion of how the particular user should configure the particular account configuration parameter are described herein in the context of using related users, although the present invention is not limited to that context.

According to some embodiments of the present invention, the related users' configuration settings of the related account configuration parameters and/or related account usage statistics are compared to the particular users' configuration settings of the related account configuration parameters and/or related account usage statistics to identify reference users that are most related to the particular user. This set of related users is referred to herein as the most related users.

According to one embodiment, configuration setting similarity criteria are used to identify the most related users. The configuration setting similarity criteria can be based on users having the same or similar configuration settings. Thus, the most related users are the related users that have the same or similar settings for the related account configuration parameters as the particular user.

According to one embodiment, usage statistics similarity criteria are used to identify the most related users. The usage statistics similarity criteria can be based on users having the same or similar usage of the system according to the related account usage statistics. Thus, the most related users are the related users that have the same or similar related account usage statistics as the particular user.

Some account configuration parameters can have settings that are specific to individual users. For example, a user's call forwarding phone numbers are likely to be specific to that user. With these types of account configuration parameters, settings for two users may be considered the same or similar so long as valid settings are provided by both of the two users even if the valid settings are different. Thus, two users can be considered to have the same or similar settings for a call forwarding phone number account configuration parameter if both users have specified a valid phone number even if the two phone numbers are different. However, the two users would not be considered to have the same or similar settings for the call forwarding parameter if one of the users has specified a valid phone number and the other user has not specified a phone number or has specified an invalid phone number. More generally, two users would not be considered to have the same or similar settings for an account configuration parameter if one of the users has provided a valid configuration setting and the other of the users has not provided a configuration setting or has provided an invalid configuration setting.

Some account configuration parameters can have default settings selected for users by the cloud-based phone system. An example of a default setting for a voicemail account configuration parameter is: all calls to a user that are not answered within a certain number of rings are directed to the user's voicemail. The system can consider an account configuration parameter for a user to have the default setting if the user has never changed the parameter from its initial setting assigned by the system. Thus, if the user changes the setting of the parameter from the initial setting to a new setting, the system can consider the account configuration parameter for the user to no longer have the default setting. Further, if the user changes the setting back to the initial setting, the system can still consider the account configuration parameter for the user to no longer have the default setting because the parameter was previously changed to a new setting. Even if the user never changes the parameter from its initial setting assigned by the system, the system can consider the parameter to no longer have the default setting for the user if the system receives an indication of tacit acceptance by the user of the initial setting. For example, if the initial setting for a parameter is presented to the user in a user interface for changing the setting of the parameter, then the system can consider the parameter to no longer have the default setting even if the user does not change the setting on the assumption that the user viewed the initial setting and decided it was appropriate and did not need to be changed. As another example, the system can consider a particular parameter to no longer have the default setting if the user submits a user interface form for changing the settings for multiple parameters one of which includes the particular parameter even if the setting of the particular parameter is not changed in the submission.

As discussed above, the most related users can be selected as the related users that have the same or similar settings for the related account configuration parameters and/or the same or similar usage of the system according to the related account usage statistics as the particular user. In some embodiments, a related account configuration parameter is not considered (ignored) in the selection of the most related users if the particular user has the default setting for the related account configuration parameter. In some embodiments, with respect to a related account configuration parameter used in the selection of most related users, settings for the given parameter by two users (e.g., a related user and the particular user) may not be considered the same or sufficiently similar if the related user has the default setting for the given related account configuration parameter, even if the particular user has a setting for the given parameter that is the same as the default setting for the given parameter.

Once the most related users are identified, the suggestion of how the particular user should configure the particular account configuration parameter is generated based on the configuration settings for the particular account configuration parameter made by the most related users. In some embodiments, the suggestion is generated based on the most predominate configuration setting for the particular account configuration parameter made by the most related users.

There may be situations where there is not a single predominate configuration setting for the particular account configuration parameter made by the most related users. In these situations, the multiple most predominate configuration settings can be suggested, offering the particular user an opportunity to select one of the multiple most predominate configuration settings as the user's setting for the particular account configuration parameter. Alternatively, it may be determined that no suggestion should be made based on the lack of a single predominate configuration setting for the particular account configuration parameter made by the most related users The suggestion can be presented or delivered to the particular user in a wide variety of different ways, depending on the requirements of the particular implementation at hand, and the present invention is not limited to any particular way. For example, the suggestion can be presented on a user interface driven by the cloud-based phone system. In this case, the suggestion can be presented on a form that allows the user to accept or reject the suggested setting. If accepted, then the cloud-based phone system applies the suggested setting to the user's account configuration settings.

The suggestion can also be delivered to the particular user such as in a push notification to a mobile phone application, an e-mail message, a text message, or left as a voice message in the user's voicemail message box maintained with the cloud-based phone system. If by push notification to a mobile phone application, the mobile phone application, or a related web application, can offer the particular user the opportunity to accept or reject the suggested setting. If accepted, the acceptance is communicated by the phone application to the cloud-based phone system whereupon the cloud-based phone system applies to the suggested setting to the user's account configuration settings. If by e-mail or text message, the message can include a hyperlink to the cloud-based phone system for accepting the suggested configuration setting. For example, submitting the hyperlink to the cloud-based phone system may indicate acceptance of the suggested setting or cause the cloud-based phone system to generate a user interface for indicating acceptance. If by voice-mail message, the cloud-based phone can support interactive voice response technology that allows the particular user to use voice commands and/or DMTF tones to indicate acceptance of the suggested setting after listening to the voice mail message.

Any of the above notifications and messages including the suggested setting may also specify or indicate, but are not required to specify or indicate, the most related users on which generation of the suggested setting was based.

In some embodiments, generation and notification of the suggested setting for the particular account configuration parameter for the particular user is triggered by various different events detected by the cloud-based phone system. The events are not limited to any particular set of events and the events that trigger generation of the suggested setting can vary depending on the requirements of the implementation at hand. In some embodiments, for example, generation of the suggested setting is triggered when the cloud-based phone system detects that the user has moved geographic locations (e.g., between different time zones). Such detection may be made by receiving geographic location data (e.g., GPS data, cellular location data, etc.) sent from mobile computing devices used by the particular user to the cloud-based phone system.

In some embodiments, some events trigger generation of the suggested setting and other later occurring events trigger notification of the suggested setting to the particular user. For example, suggested settings for multiple account configuration parameters for the particular user can be generated when the user requests a user interface form for changing the settings of the multiple account configuration parameters. The generated suggested setting for a particular one of the multiple account configuration parameters can be sent to the particular user at a later time when the particular user causes user interface focus to user interface elements for changing the particular one of parameters.

Suggestion Architecture

Figure 3:
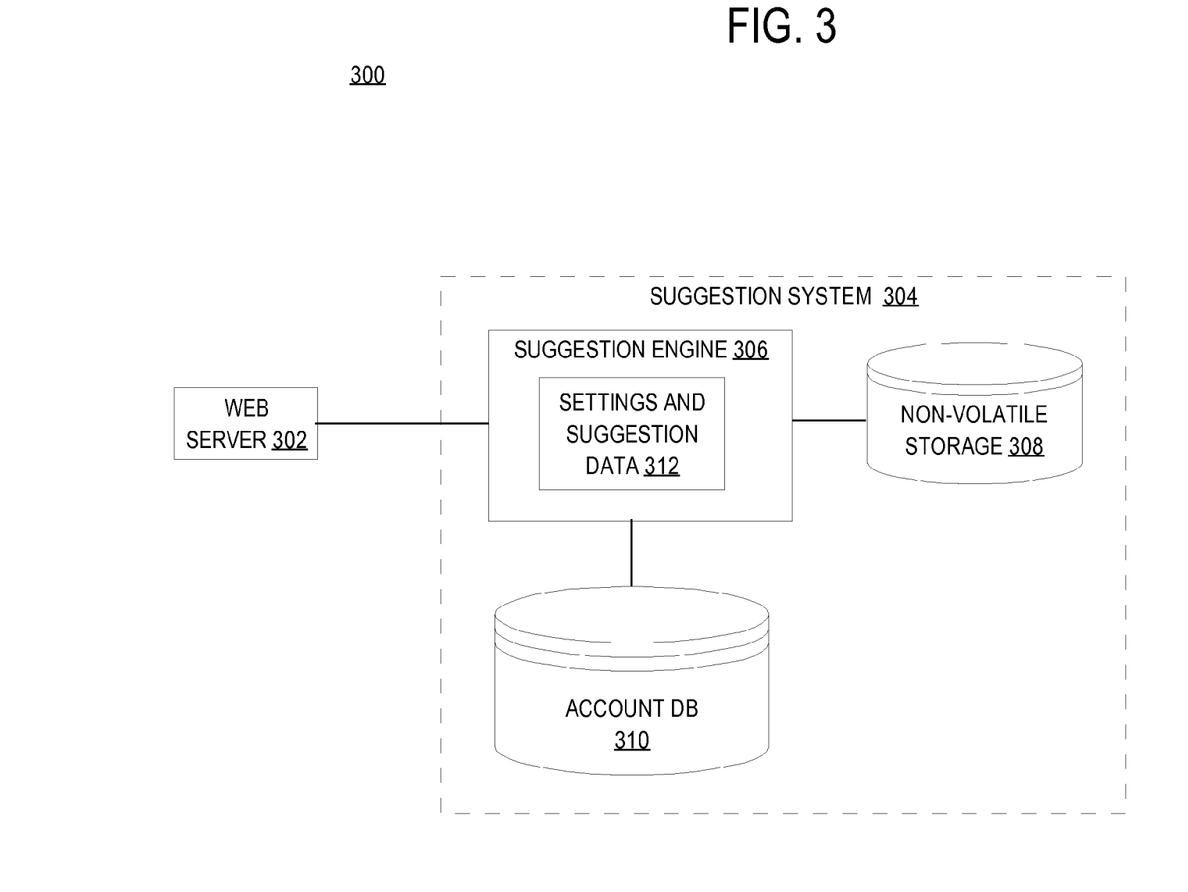
FIG. 3 is a block diagram illustrating a networked system for suggesting settings for account configuration parameters to users of a cloud-based phone system according to an embodiment of the invention.

FIG. 3 is a block diagram illustrating a networked system 300 for suggesting settings for account configuration parameters to users of a cloud-based phone system according to an embodiment of the invention. The system 300 includes a web server 302 communicatively coupled to a suggestion system 304. Suggestion system 304 is configured to process configuration settings data to provide suggested settings for account configuration parameters to users. Suggestion system 304 includes a suggestion engine 306, a non-volatile storage 308, and an account configuration settings and account usage statistics database (account database) 310. Suggestion engine 306 can be implemented by any mechanism or any combination of hardware and software for performing the functions described herein. For purposes of explanation only, suggestion engine 306 is described in the context of a software process executing in a volatile memory. Non-volatile storage 308 can be implemented by any type of non-volatile storage mechanism and the invention is not limited to any particular mechanism. Example implementations include, without limitation, non-volatile memory and disc storage. Account database 310 can be implemented by any database management mechanism and the invention is not limited to any particular implementation.

Suggestion engine 306 maintains configuration settings and suggestion data 312 that includes users' actual configuration settings for account configuration parameters and suggested settings generated according to the algorithms described herein, or otherwise. Some or all of settings and suggestion data 312 may be maintained in a volatile memory, such as a random access memory (RAM), to reduce access times. Alternatively, all of settings and suggestion data 312 may be maintained in non-volatile storage 308. According to one embodiment of the invention, settings and suggestion data 312 stored in volatile memory is periodically saved to non-volatile storage 308 or other non-volatile storage so that suggestion engine 306 may be periodically shut down for maintenance and upgrade without losing any of the settings and suggestion data 312 stored in volatile memory. Some or all of settings and suggestion data 312 can also be stored in account database 310. Account database 310 may also store any data contained in the non-volatile storage 308 or any other data used by suggestion system 304, depending upon the requirements of a particular implementation.

Suggestion engine 306 is configured to generate a suggested setting for a particular account configuration parameter for a particular user on request. The request may be made by the web server 302, for example, as part of generating a web page to send to a client computer device (not shown) operatively coupled to the web server 902 by a data network (e.g., the Internet (also not shown)). The request may also be made by other cloud-based phone system components or processes. For example, a monitoring process (not shown) or system of the cloud-based phone system that monitors for when users change configuration settings in account database 310 can request suggested settings for users from suggestion engine 306. Other types of monitoring process may make similar requests. For example, a monitoring process that detects when users move geographic locations based on geographical location data may also request suggested settings for the users from suggestion engine 306.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. In a cloud-based phone system comprising one or more computing devices, a method for generating a suggested setting for a first account configuration parameter from a plurality of account configuration parameters for a particular user of the cloud-based phone system, the method comprising:

identifying, from the plurality of account configuration parameters, at least one second account configuration parameter;

selecting, based on user selection criteria, a set of related users from a plurality of users that use the cloud-based phone system, wherein the set of related users are related to the particular user by a particular organizational relationship;

determining account usage statistics for the set of related users regarding the first account configuration parameter;

selecting, based at least in part on the account usage statistics and user similarity criteria, at least one reference user from the set of related users, wherein a setting for the at least one second account configuration parameter associated with the at least one reference user is the same or similar to a setting for the at least one second account configuration parameter associated with the particular user; and providing a suggested setting for the first account configuration parameter for the particular user of the cloud-based phone system based at least in part on the account usage statistics and a setting for the first account configuration parameter associated with the at least one reference user.

2. The method of claim 1, wherein identifying from the plurality of account configuration parameters, the at least one second account configuration parameter includes identifying the at least one second account configuration parameter from mapping data that associates the first account configuration parameter with the at least one second account configuration parameter.

3. The method of claim 1, wherein selecting the at least one reference user includes selecting at least one reference user from the set of related users that has configured the at least one second account configuration parameter with a setting that is exactly the same as a setting configured by the particular user.

4. The method of claim 1, further comprising providing the suggesting setting to the particular user.

5. The method of claim 4, wherein providing the suggestion setting to the particular user includes sending an e-mail message or a text message to the particular user with the suggested setting.

6. The method of claim 1, wherein generating the suggested setting for the first account configuration parameter for the particular user includes determining a most predominant configuration setting from among the settings configured for the first account configuration parameter by the at least one reference user.

7. The method of claim 1, wherein generating the suggested setting is performed in response to detecting geographical movement of the particular user.

8. The method of claim 7, wherein detecting the geographical movement of the particular user includes receiving geographical location data from a mobile computing device of the particular user.

9. The method of claim 1, wherein generating the suggested setting is performed in response to the particular user requesting a web page from the cloud-based phone system.

10. The method of claim 1, wherein the first account configuration parameter is at least one of: a call answering rule, a call forwarding rule, a call notification setting, a caller identification setting, and a call greeting option.

11. A cloud-based phone system comprising:
one or more computing devices;
one or more non-transitory computer-readable media storing instructions which,
when executed by the one or more computing devices, cause performance of a method for generating a suggested setting for a first account configuration parameter from a plurality of account configuration parameters for a particular user of the cloud-based phone system, the method comprising:
identifying, from the plurality of account configuration parameters, at least one second account configuration parameter;
selecting, based on user selection criteria, a set of related users from a plurality of users that use the cloud-based phone system, wherein the set of related users are related to the particular user by a particular organizational relationship;
determining account usage statistics for the set of related users regarding the first account configuration parameter;
selecting, based at least in part the account usage statistics and user similarity criteria, at least one reference user from the set of related users, wherein a setting for the at least one second account configuration parameter associated with the at least one reference user is the same or similar to a setting for the least one second account parameter associated with the particular user;
providing a suggested setting for the first account configuration parameter for the particular user of the cloud-based phone system based at least in part on the account usage statistics and a setting for the first account configuration parameter associated with the at least one reference user.

12. The system of claim 11, wherein identifying from the plurality of account configuration parameters, the at least one second account configuration parameter includes identifying the at least one second account configuration parameter from mapping data that associates the first account configuration parameter with the at least one second account configuration parameter.

13. The system of claim 11, wherein selecting the at least one reference user includes selecting at least one reference user from the set of related users that has configured the at least one second account configuration parameter with a setting that is exactly the same as a setting configured by the particular user.

14. The system of claim 11, the method further comprising providing the suggesting setting to the particular user.

15. The system of claim 14, wherein providing the suggestion setting to the particular user includes sending an e-mail message or a text message to the particular user with the suggested setting.

16. The system of claim 11, wherein generating the suggested setting for the first account configuration parameter for the particular user includes determining a most predominant configuration setting from among the settings configured for the first account configuration parameter by the at least one reference user.

17. The system of claim 11, wherein generating the suggested setting is performed in response to detecting geographical movement of the particular user.

18. The system of claim 17, wherein detecting the geographical movement of the particular user includes receiving geographical location data from a mobile computing device of the particular user.

19. The system of claim 11, wherein generating the suggested setting is performed in response to the particular user requesting a web page from the cloud-based phone system.

20. The system of claim 11, the method further comprising:
determining account usage statistics from the set of related users;
selecting the at least one reference user for the set of related users based at least in part on the account usage statistics;
determining account usage statistics of the account usage statistics for the one at least one reference user;
generating the suggested setting for the first account configuration parameter for the particular user based at least in part on the account usage statistics for the at least one reference user.

21. The system of claim 20, wherein determining account usage statistics for the set of related users includes determining account usage statistics for the set of related users related to the first account configuration parameter.

22. The system of claim 11, wherein the first account configuration parameter is at least one of: a call answering rule, a call forwarding rule, a call notification setting, a caller identification setting, and a call greeting option.

* * * * *